United States Patent
Fischer

(10) Patent No.: US 9,835,439 B2
(45) Date of Patent: Dec. 5, 2017

(54) METHOD FOR ELECTRONIC CONTROL OF A MEASUREMENT STAND

(71) Applicant: Helmut Fischer GmbH Institut fur Elektronik und Messtechnik, Sindelfingen (DE)

(72) Inventor: Helmut Fischer, Oberageri (CH)

(73) Assignee: Helmut Fischer GmbH Institut für Elektronik und Messtechnik, Sindelfingen (DE)

( * ) Notice: Subject to any disclaimer, the term of this patent is extended or adjusted under 35 U.S.C. 154(b) by 132 days.

(21) Appl. No.: 15/061,283

(22) Filed: Mar. 4, 2016

(65) Prior Publication Data

US 2016/0258739 A1  Sep. 8, 2016

(30) Foreign Application Priority Data

Mar. 4, 2015  (DE) .......................... 10 2015 103 136

(51) Int. Cl.
 *G01B 5/02* (2006.01)
 *G01B 11/06* (2006.01)
 (Continued)

(52) U.S. Cl.
 CPC ............ *G01B 11/06* (2013.01); *G01B 5/0004* (2013.01); *G01B 21/047* (2013.01); *G05B 19/401* (2013.01); *G05B 2219/37008* (2013.01)

(58) Field of Classification Search
 CPC .................................... G01B 5/02; G01B 7/02
 (Continued)

(56) References Cited

U.S. PATENT DOCUMENTS 7,610,690 B2 * 11/2009 Fischer ................ G01B 5/0004
 33/572
8,745,889 B2 * 6/2014 Fischer ................ G01B 5/0004
 33/572

(Continued)

FOREIGN PATENT DOCUMENTS

DE         30 11 148 A1   10/1981
DE     10 2010 011 633 A1  10/2010
GB          2468766 A       9/2010

*Primary Examiner* — G. Bradley Bennett
(74) *Attorney, Agent, or Firm* — Renner, Otto, Boiselle & Sklar, LLP

(57) ABSTRACT

The invention relates to a method for the electric control of a measurement stand (11) having a drive movement of at least one measurement probe (26) from an initial position (31) into a measurement position (32), in particular for the measurement of the thickness of thin layers in which a motor (34) is controlled for the drive movement of the measurement probe (26), said motor (34) moving a ram (23), to which the measurement probe (26) is fastened, back and forth via a drive device (35) at least for the implementation of a measurement, wherein before a first measurement with the measurement probe (26), a learning routine is carried out, and for the subsequent implementation of one or more measurements, the measurement probe (26) is transferred from the initial position (31) into the measurement position (32), and the drive path of the measurement probe (26) from the initial position (31) into the measurement position (32) is divided into a fast speed and, before the setting of the measurement probe (26) on the measurement object (14), a slow speed, wherein the number of pulses for the fast speed is reduced by the number of pulses for the slow speed, originating from the total number of the determined pulses of the drive path and the number of pulses for the drive path at the fast speed is a multiple of the number of pulses of the drive path at the slow speed.

7 Claims, 5 Drawing Sheets

Figure 1:
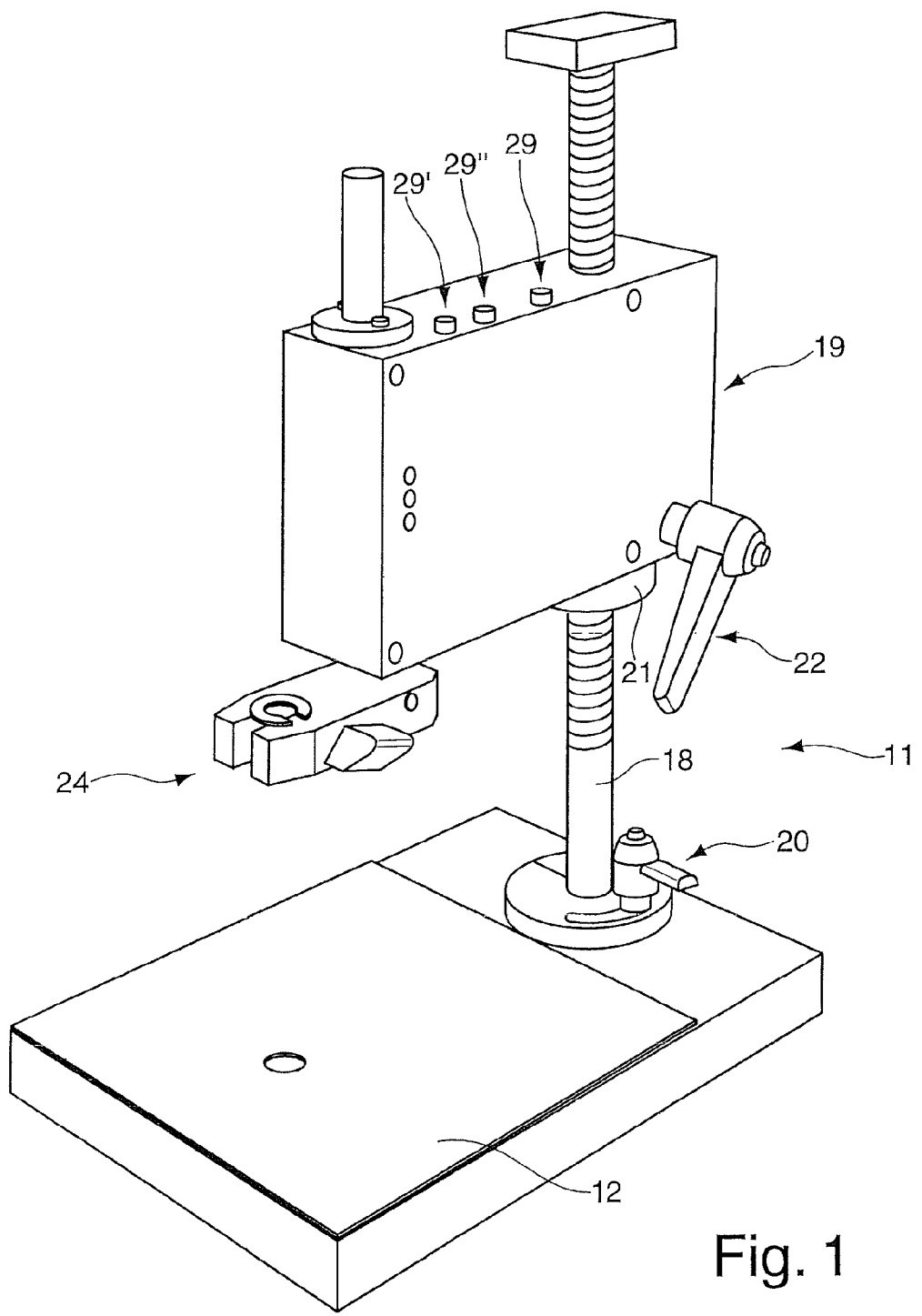

(51) Int. Cl.
*G01B 21/04* (2006.01)
*G01B 5/00* (2006.01)
*G05B 19/401* (2006.01)

(58) Field of Classification Search
USPC .................................................. 33/832, 833
See application file for complete search history.

(56) References Cited

U.S. PATENT DOCUMENTS

| | | | | |
|---|---|---|---|---|
| 2010/0241397 | A1* | 9/2010 | Fischer | G01B 5/0004 |
| | | | | 702/170 |
| 2014/0317941 | A1* | 10/2014 | Patti | G01B 5/012 |
| | | | | 33/503 |
| 2014/0331511 | A1* | 11/2014 | Yamauchi | G01B 5/20 |
| | | | | 33/558 |
| 2015/0226586 | A1* | 8/2015 | Fischer | G01D 11/30 |
| | | | | 73/866.5 |
| 2015/0316459 | A1* | 11/2015 | Volz | G12B 5/00 |
| | | | | 73/82 |
| 2016/0076871 | A1* | 3/2016 | Volz | G01B 7/105 |
| | | | | 324/227 |

* cited by examiner

METHOD FOR ELECTRONIC CONTROL OF A MEASUREMENT STAND

This application claims priority of German Application No. 10 2015 103 136.1 filed Mar. 4, 2015, which is hereby incorporated herein by reference.

The invention relates to a method for electronic control of a measurement stand having a drive movement of at least one measurement probe from an initial position into a measurement position, in which the measurement probe is supported on a surface of a measurement object, in particular for the measurement of the thickness of thin layers.

A measurement stand as well as a method for the electronic control thereof is known from DE 10 2010 011 633 A1. Before carrying out a measurement of the thickness of thin layers on a measurement object using such a measurement stand, a learning routine is implemented whereby the drive movement of the measurement probe is recorded from an initial position into a measurement position such that any measurement probe can be adjusted to a measurement task depending on the measurement object and a soft setting of the measurement probe on the surface of the measurement object is enabled. A distance between an initial position and a measurement position on the measurement object is thereby recorded by a drive movement of the measurement probe from an initial position into a measurement position being controlled, wherein during setting of the measurement probe on the measurement surface, a freewheel is activated, through which the lifting path of the ram which receives the measurement probe is decoupled from a drive device. Through the activation of the freewheel, a signal is emitted by means of a forked photoelectric sensor and the number of pulses of a travel sensor is thereby recorded, originating from the default initial position until the activation of the freewheel. The drive path for the measurement probe is thereby determined. Furthermore, during activation of the freewheel, the motor is shut down and a deceleration of the motor is recorded. For the subsequent implementation of the measurement, the drive movement is divided into a fast speed and a slow speed, wherein the slow speed is determined by the recorded drive path of the decelerating motor. A soft setting of the measurement probe on the measurement surface of the measurement object can thereby be achieved.

The object of the invention is to improve a method for electrical control of a measurement stand having a drive movement of at least one measurement probe from an initial position into a measurement position, which can also be used for measurement stands in which the determination of a drive path occurs without an activation of a freewheel.

This object is solved by a method according to the features of claim 1. Further advantageous embodiments and developments are specified in the further dependent claims.

In the method according to the invention, a learning routine is also provided, wherein, in this learning routine, the measurement probe is lowered from a default initial position with a predetermined drive speed until the measurement probe is supported on a measurement surface of the measurement object or on a calibration normal corresponding to a measurement object and at the point in time of the support of the measurement probe on the measurement surface of the measurement object, a control signal is emitted from the measurement probe and the motor is shut down. This control signal can shut the motor down directly or indirectly via the drive control. Through the determination of a number of pulses of the motor or of a path sensor coupled to the motor from the beginning of the drive movement of the measurement probe from the default initial position until the shutdown of the motor in the measurement position, the drive path for the new measurement task is recorded. For the subsequent implementation of one or more measurements, the measurement probe is transferred from the initial position into the measurement position, wherein the drive path is divided into a fast speed and a slow speed, originating from the total number of the determined pulses, and the number of pulses for the fast speed is reduced by the number of pulses for the slow speed, wherein the number of pulses for the drive path at the fast speed comprises a multiple of the number of pulses of the drive path at the slow speed. The determination of the drive path from a default initial position into a measurement position can thereby be simplified—so during support of the measurement probe on a surface of the measurement object. Additionally, through the determination of the number of pulses for a slow speed, a specific adaptation to different control devices or motors of measurement stands can be enabled which can have different delays. A soft setting on the measurement surface of the measurement object can be achieved using the path stretch of the slow speed such that the drive speed is also sufficiently reduced and dissipated from the fast speed. Such a method also enables the use of a measurement stand without a freewheel activation, so sensor arrangement in the freewheel, between a holder receiving the measurement probe with a ram and a drive device.

Preferably, during the approach of the measurement probe to the measurement surface of the measurement object or of the calibration standard, a signal change of the measurement probe is recorded and is emitted in the case of a constant measurement signal being recorded by the measurement probe as a control signal to shut down the motor. The drive path between the default initial position and the measurement surface thereby can be recognised in a simple manner by means of the measurement probe during the learning routine, determined therefrom and recorded.

Furthermore, the speed reduction from the fast speed to a slow speed is preferably reduced with a function of at least 1:10. A continuous reduction of the drive speed with increasing approach of the measurement probe to the measurement surface is thereby able to be adjusted. Alternatively, a discontinuous reduction of the drive speed can also be provided which is reduced with increasing drive path.

Furthermore, the predetermined drive speed for the learning routine during lowering of the measurement probe to the measurement position is preferably controlled to be lower than the fast speed during the implementation of the measurement. Indeed, the time duration for the learning routine is only slightly elongated compared to the implementation of a measurement, however a secure setting without an impairment of the measurement probe and/or the measurement surface can thereby be enabled.

A further preferred embodiment of the method provides that, after the implementation of the learning routine, in particular on a measurement surface of the measurement object, the measurement object is shifted by at least one further measurement position for subsequent measurements. The precision of the measurement for the measurement object can thereby be increased. Advantageously, several measurement positions are started on a measurement surface of the measurement object. The evenness of a coating or layer thickness of a coating can thereby be detected.

Furthermore, the number of pulses is advantageously determined for the drive path of the measurement probe at the slow speed, in such a way that the drive path at the slow speed is smaller than the thickness of the layer to be measured on the object or the thickness of the measurement object. A considerable time reduction of a measurement cycle can thereby be achieved.

Figure 2:
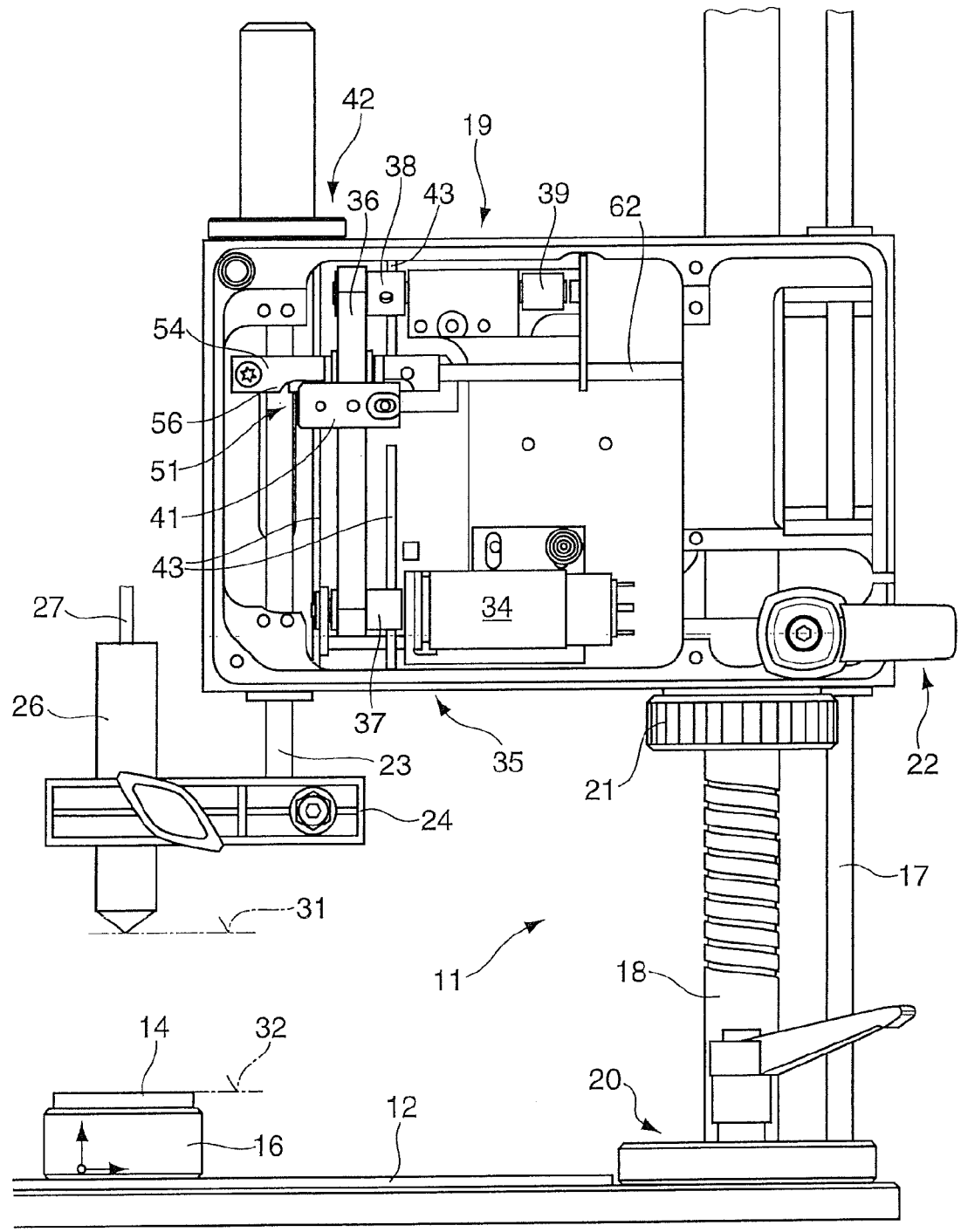
Figure 3:
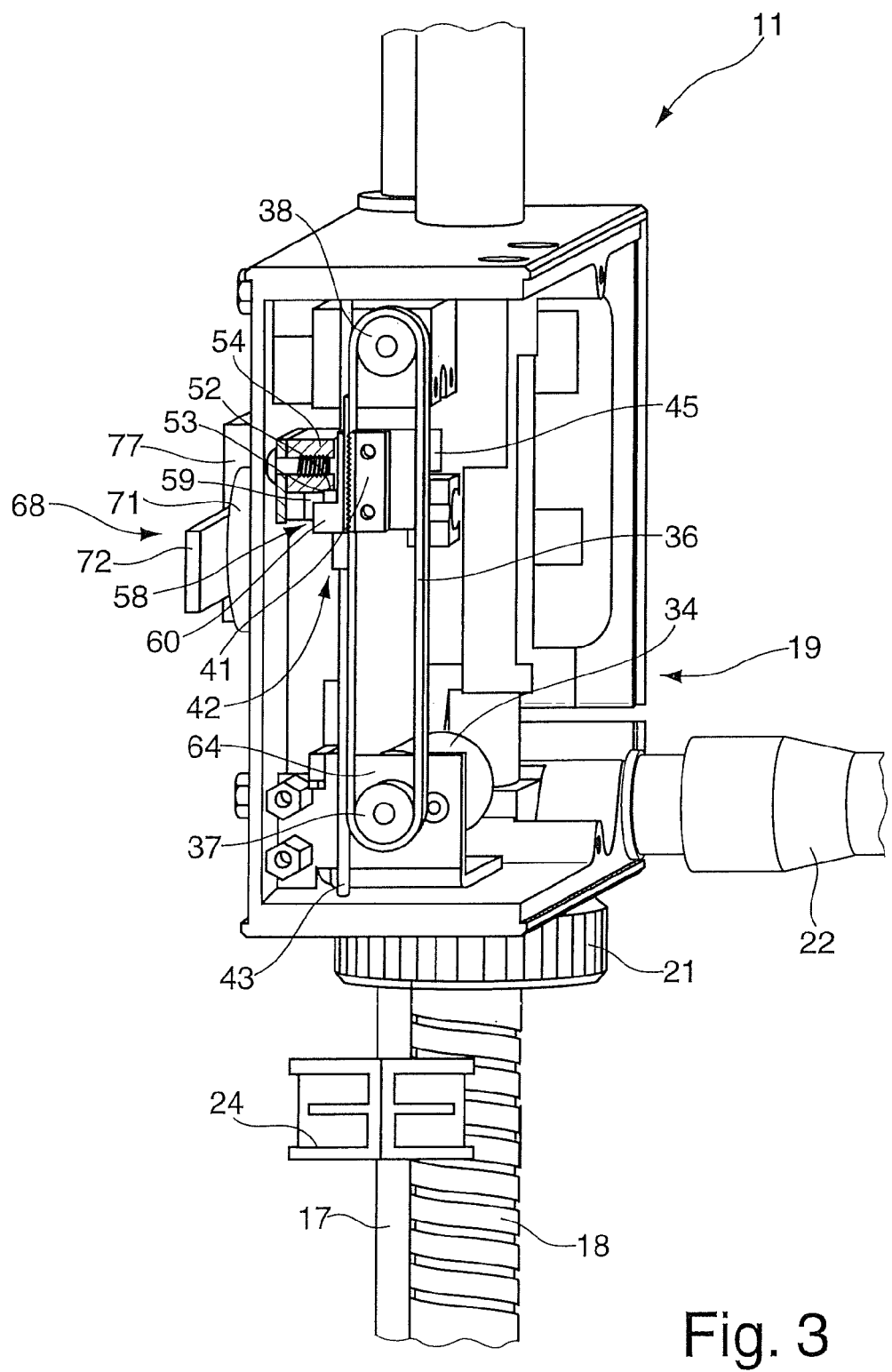
Figure 4:
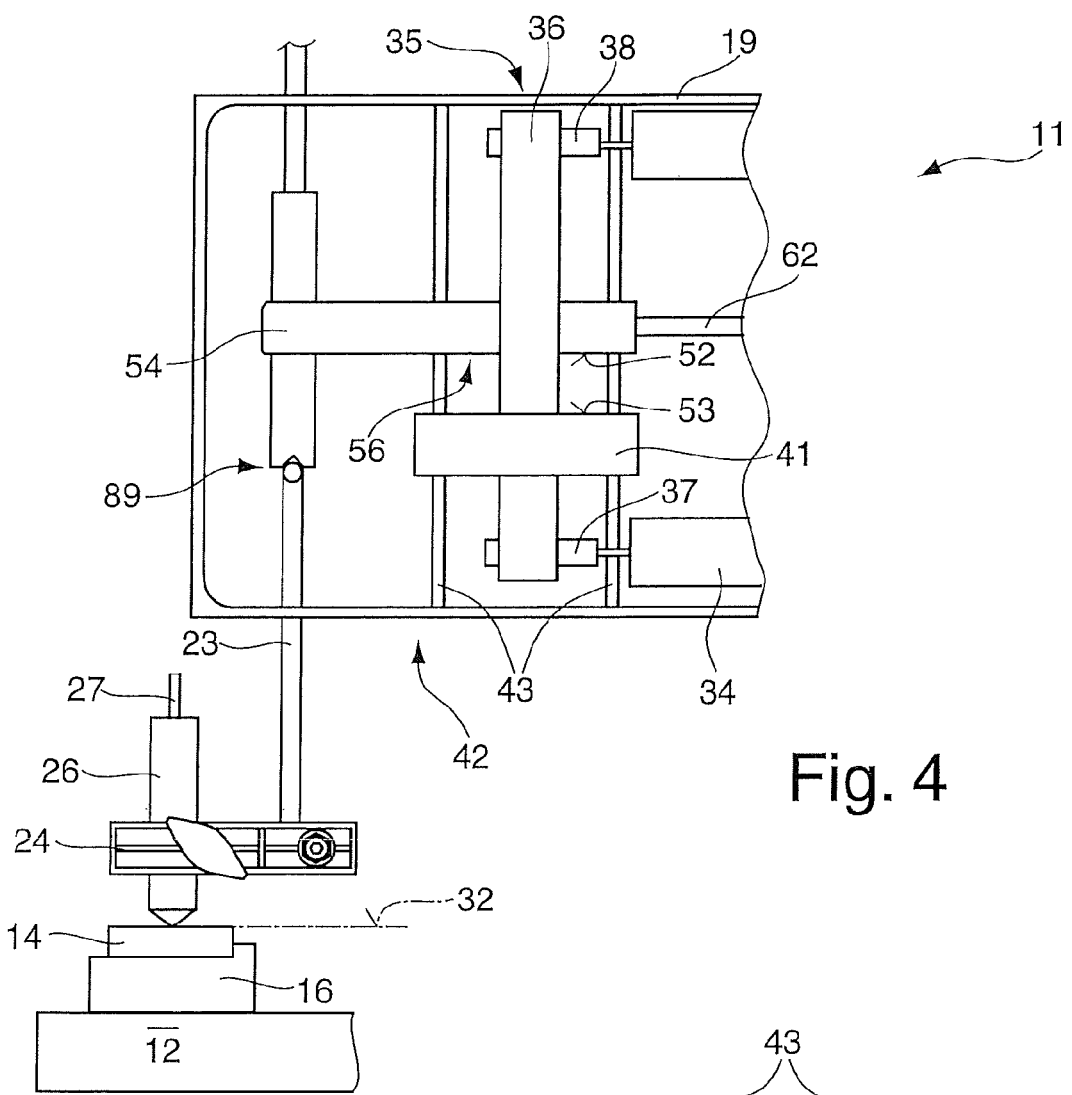
Figure 5:
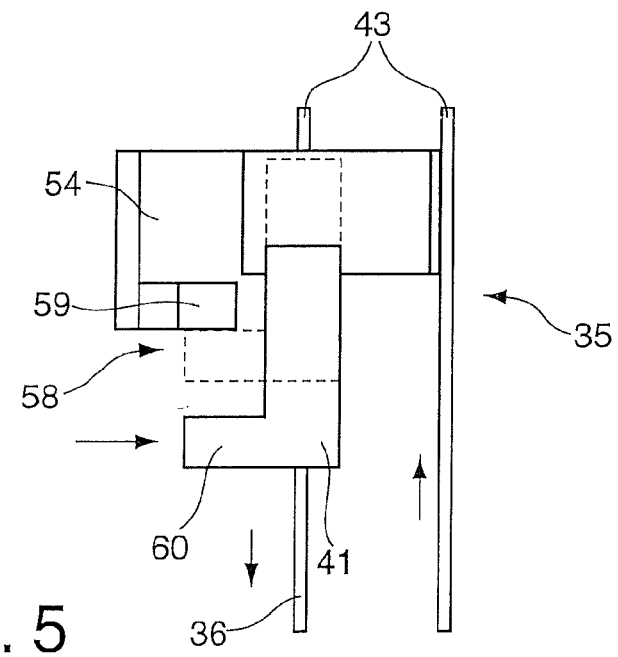
Figure 6:
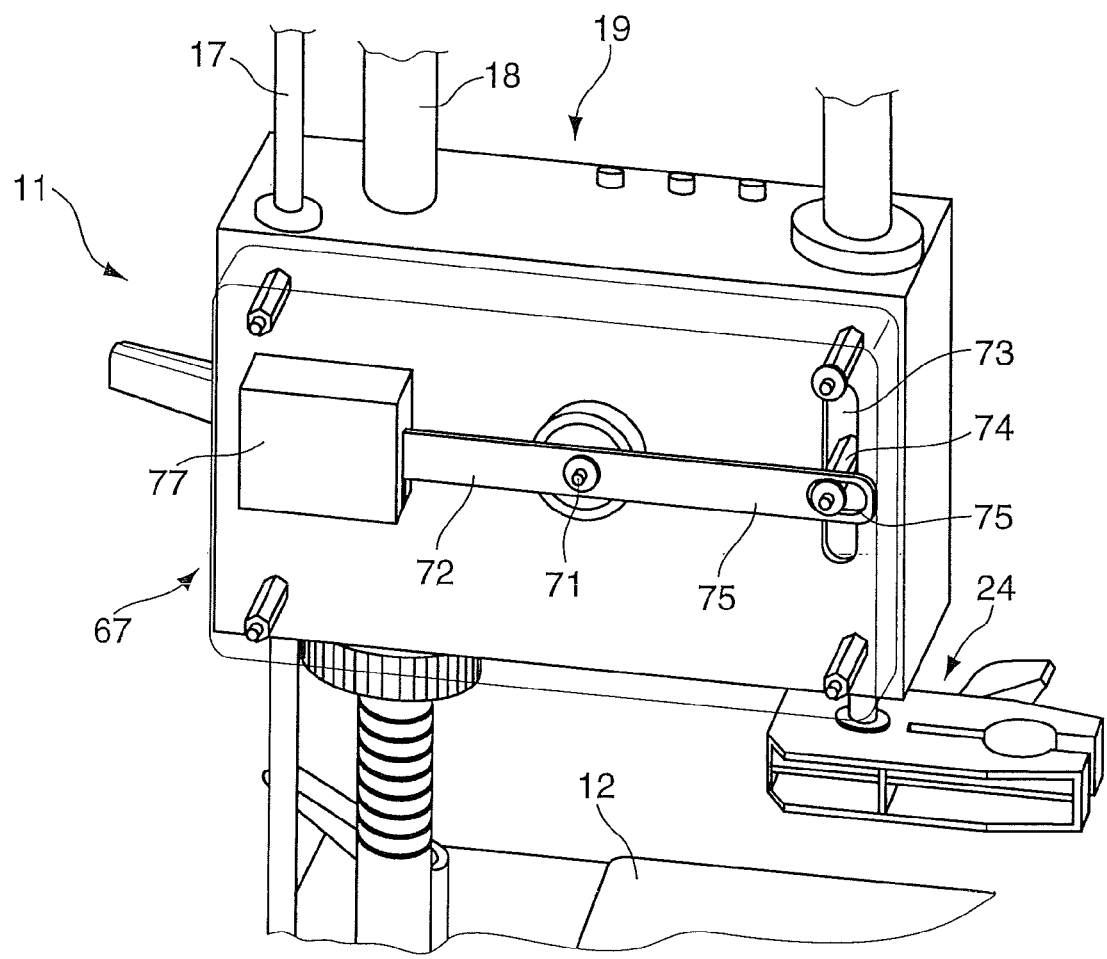

The invention as well as further advantageous embodiments and developments of the same are described and explained in more detail below by means of the examples depicted in the drawings. The features to be gleaned from the description and the drawings can be applied individually or together in any combination according to the invention. Here are shown:

FIG. 1 a perspective depiction of a measurement stand,

FIG. 2 a schematic side view onto a housing of the measurement stand according to FIG. 1 having a measurement probe in an initial position, FIG. 3 a perspective view onto a front side of the housing of the measurement stand according to FIG. 1, FIG. 4 a schematic side view onto the housing of the measurement stand having a measurement probe in a measurement position, FIG. 5 a schematic detailed view of a switching device of the measurement stand according to FIG. 1, and FIG. 6 a perspective view onto a back wall of the housing of the measurement stand according to FIG. 1 having a weight relief device according to FIG. 1.

In FIG. 1, a measurement stand 11 is depicted perspectively, and in FIG. 2 in a side view. This measurement stand 11 comprises a measurement table 12 on which individual measurement objects 14 can be laid directly or can be held by a receiver 16. A perpendicular column 17 is provided at the foot of the measurement stand 11 or on the measurement table 12 which receives a housing 19 with a thread column 18 in a height-adjustable manner. A parallel guide for easy height adjustment can be provided by the two columns 17, 18 which are arranged to be adjacent to each other. An alignment of the housing 19 is enabled by the adjustment mechanism 20. The height can be adjusted via an adjustment screw 21. Additionally, a clamping mechanism 22 is provided in order to fix the housing 19 at the height of the measurement table 12.

A ram 23 is received on the housing 19 to be able to move back and forth, lying opposite the columns 17, 18. A receiver 24 for releasable fixing of measurement probes 26 or sensors or similar is provided on the lower end of the ram 23. The receiver 24 can alternatively also be formed to receive several measurement probes 26 or sensors. The measurement probe 26 is, for example, provided for the measurement of the thickness of thin layers. This measurement probe 26 has a sensor element having a positioning cap which is able to be set on a measurement surface of the measurement object 14. A connection line 27 is provided on the opposite end of the measurement probe 26 which is connected to a separate measurement device which is not depicted in more detail or is able to be connected on a front side of the housing 19 to a connection of the measurement stand of a control and regulation device which is not depicted in more detail.

For example, three operating elements 29, in particular buttons, are provided on an upper side of the housing 19, the function of which is described below.

In FIG. 2, the measurement probe 26 is arranged in an initial position 31. The measurement probe 26 can be lowered by the ram 23 and transferred into a measurement position 32 which corresponds in this exemplary embodiment to a setting position on the measurement surface of the measurement object 14. The distance or drive path lying between the initial position 31 and the measurement position 32 is smaller than a work region or lifting path of the ram 23. The housing 19 is preferably pre-positioned via the adjustment screw 21 with respect to the measurement surface of the measurement object 14 in such a way that the initial position 31 and the measurement position 32 are located within the work region of the ram 23.

An electric motor 34 is provided in the housing 19 for the control of a drive movement, which drives a drive device 35 which is connected to the ram 23. The drive device 35 comprises a drive element 36 which in particular is formed as a toothed belt. This drive element 36 is received by an upper and lower pulley 37, 38. These pulleys 37, 38 are preferably formed as tooth rollers and adapted to the contour of the teeth of the toothed belt. Through the selection of the toothed belt and the tooth roller, a slip-free transfer of the drive movement is enabled. The lower pulley 37 is fastened directly to the drive axle of the motor 34. The upper pulley 38 is provided on an axis of rotation which is part of a path sensor 39. This path sensor 39 is provided as a rotation encoder, in particular as a programmable rotation encoder which records pulses depending on the drive movement of the measurement probe 26 from the initial position 31 to the measurement position 32 and transmits these recorded pulses to a control and regulation device. Alternatively, the path sensor can also be integrated into the motor 34.

A coupling element 41 is provided on the drive element 36 which is depicted in more detail in FIG. 3. The coupling element 41 is guided along a guide 42, which preferably comprises two guide elements 43 which are aligned in parallel to each other, in particular guide rods. The coupling element 41 is connected to the drive element 36 by a clamp fastening. The coupling element 41 has a U-shaped contour, seen in the top view, such that the drive element 36 is guided within the two limbs of the U-shaped contour and the respective limbs engage with the guide elements 43. Preferably, a switching flag 45 is provided on the coupling element 41 which works together with a sensor element or a forked photoelectric sensor, which is arranged on a circuit board which is not depicted in more detail and which is also part of the control and regulation device. An upper end position of the drive device 35 can thereby be recorded. The control and regulation device is likewise preferably arranged in the housing 19 and only removed from the housing 19 for the depiction of the mechanical components.

The ram 23 and the drive device 35 are coupled to each other by a freewheel 51 (FIG. 3). This freewheel 51 is formed on the one hand by a support surface 52 arranged on the coupling element 41 and on the other hand a contact surface 53. Through the inherent weight of the ram 23, the contact surface 53 is supported on the support surface 52. This contact surface 53 is preferably provided on a carriage 54 which is guided to be able to move back and forth, preferably on the guide 42. The carriage 54 has a receiving section 56 via which the ram 23 is coupled releasably to the carriage 54. Through the support of the ram 23 on the drive device 35, during a drive movement of the measurement probe 26 which is driven by the motor 34, directly after the setting of the measurement probe 26 on a measurement surface of the measurement object 14, a deceleration of the motor 34 and therefore a further lowering of the coupling element 41 is enabled without the drive force being transferred to the ram 23 and therefore to the measurement probe 26. This decoupled position of the freewheel 51 is depicted in FIG. 4.

The freewheel 51 can comprise a switching device 58 which is activated as soon as a lifting of the contact surface 53 from the support surface 52 occurs. For this, the switching device 58 has a first component 59 which is arranged on the carriage 54 or ram 23 and a second component 60 which is connected to the coupling element 41 or the drive device

35. Preferably, the first component 59 is formed as a forked photoelectric sensor and the second component 60 as a switching finger or switching flag 45. As soon as the freewheel 51 is activated, the second component 60 is brought out from the first component 59 and a switching signal is emitted to the control and regulation device. This position is depicted with a dashed line in FIG. 5. Preferably, a circuit board is arranged on the carriage 54 which processes the switching signal of the forked photoelectric sensor which is fastened to the circuit board and transmits it to the control and regulation device. The control lines required for this are preferably fastened to a guide rod 62 which is able to be moved back and forth in a guide close to the thread column 18. The guide rod 62 is connected to the carriage 54 firmly at one end. Lying opposite, the guide rod has a roller or plain bearing which is able to be moved back and forth in the guide. Through this guide rod 62, a possible radial drive force acting on the ram 23 is eliminated.

A bearing position 64 for mounting the drive axle of the motor 34 serves, at the same time, as a stop for a downward drive movement of the drive device 35 downwards.

In FIG. 6, a weight relief device 68 is provided on a back side 67 of the housing 19. This weight relief device 68 can then be attached if the receiver 24 receives several measurement probes 26 or sensors or larger and heavier measurement probes 26 or similar. This weight relief device 68 causes the at least one measurement probe 26 to sit on the measurement surface with an only slight inherent weight force. The weight relief device 68 is fastened to the back wall 67 via a bearing axis 71 and receives a lever arm 72 to be able to pivot. A fastening pin 74 is provided on one end of the lever arm 72 which engages on the ram 23 and penetrates a through bore 73 in the back side 67. The fastening pin 74 is fastened in a longitudinal hole recess 75 of the lever arm 72 such that a compensation movement is enabled during the pivot movement of the lever arm 72. Lying opposite, at least one mass body 77 is provided on the lever arm 72. This can be able to be driven along the lever arm 72 depending on the load to be received by the receiver 24. Additionally, the mass body 77 can be provided to be able to be exchanged on the lever arm 72 such that larger or smaller mass bodies 77 can be attached thereto. Preferably, this weight relief device 68 is covered and protected by a cover.

The above measurement stand 11 can also be formed without the freewheel activation or without the emission of a sensor signal on triggering the freewheel 51, which is depicted in more detail in FIG. 5.

The measurement stand 11 can be operated, as described below.

A measurement object 14 is positioned on the measurement table 12 directly or indirectly. The measurement receiver 24 receives a measurement element, in particular a measurement probe 26 to measure the thickness of thin layers. The measurement probe 26 is connected to a separate measurement device which is not depicted in more detail. The housing 19 is pre-positioned in height in such a way that the distance between the measurement probe 26 or the probe tip of the measurement probe 26 and the measurement surface of the measurement object 14, which lies in the measurement position 32, lies within the work region of the ram 23 or the drive path of the drive device 35 for movement of the ram 23 back and forth.

The measurement probe 26 is arranged in the initial position 31. Before the implementation of measurements on the measurement object 14, firstly the position of the measurement surface of the measurement object 14 with respect to the initial position 31 is determined by a learning routine. This can, for example, be initiated by operation of the button 29. In this learning routine, the motor 34 is preferably driven with a constant current by the control and regulation device. A constant drive movement of the measurement probe 26 into the measurement position 32 can thereby be controlled. At the same time, the signals detected by the measurement probe 26 are monitored. As the measurement probe 26 in the initial position 31 is far away from the measurement surface of the measurement object 14, the measurement probe 26 cannot emit a measurement signal or a drive movement close to the initial position 31 in the direction of the measurement object occurs without a signal change of the measurement probe, from which it emerges that a sufficiently large distance to the surface of the measurement object 14 is still present. At the same time, with the beginning of the drive movement, the number of pulses of the motor 34 or of a path sensor coupled to the motor 34 is recorded.

During the approach of the measurement probe 26 to the measurement object 1, a signal change occurs such that, using the control and regulation device of the motor 34 which is connected to the control of the measurement probe 26, it can be recognised that an approach of the measurement probe 26 to the measurement object 14 occurs. During setting of the measurement probe 26 on the measurement surface of the measurement object 14 in the measurement position 32, using the measurement probe 26, a constant measurement signal is emitted. This measurement signal forms the control signal, due to which the motor 34 is shut down. At the same time, at the point in time of the shutdown of the motor 34, the number of pulses is recorded. The total drive path for the new measurement task is recognised from the number of pulses.

Subsequently, the measurement probe 26 is returned again into the initial position 31, and the learning routine is ended.

The learning routine can be modified to the effect that the lowering movement of the measurement probe 26 to the measurement object 14 is reduced in the case of increasing proximity, depending on the measurement signals recorded by the measurement probe 26, such that a soft setting of the probe 26 on the surface of the measurement object 14 is enabled.

After the implementation of the learning routine, the drive path determined by the number of pulses is divided into a fast speed and a slow speed, wherein the number of pulses to control the drive path at the fast speed comprises a multiple of the number of pulses for the drive path at the slow speed. For example, the slow speed comprises a number of pulses of less than a tenth of the number of pulses for the fast speed.

Subsequently, for example, the button 29' is pressed in order to control a single drive movement of the measurement probe 26 from the initial position into the measurement position and back again into the initial position. Additionally, the button 29" can be provided. This button 29" can be able to be programmed freely, wherein this, for example, is able to be programmed in such a way that a predetermined number of repetitions to implement the measurement is implemented automatically.

The invention claimed is:

1. A method for the electrical control of a measurement stand having a drive movement of at least one measurement probe from an initial position into a measurement position, in particular for the measurement of the thickness of thin layers, in which a motor is controlled for the drive movement of the measurement probe, said motor moving a ram, to which the measurement probe is fastened, back and forth via a drive device at least to implement a measurement, wherein before a first measurement with the measurement probe, a learning routine is carried out, in which the measurement probe is lowered from the default initial position with a predetermined drive speed until the measurement probe is supported on a measurement surface of the measurement object or on a calibration normal corresponding to the measurement object, in which, at the point in time of the support of the measurement probe on the measurement surface, a control signal is emitted by the measurement probe and the motor is shut down, in which a number of pulses of the motor of a path sensor coupled to the motor is recorded from the beginning of the drive movement of the measurement probe from the default initial position until the shutdown of the motor in the measurement position and in which the measurement probe is guided back into the initial position and the learning routine is ended, and for the subsequent implementation of one or more measurements, the measurement probe is transferred from the initial position into the measurement position, and the drive path of the measurement probe from the initial position into the measurement position is divided into a fast speed and, before the setting of the measurement probe on the measurement object, a slow speed, wherein the number of pulses for the fast speed is reduced by the number of pulses for the slow speed, originating from the total number of determined pulses for the drive path, and the number of pulses for the drive path at the fast speed is a multiple of the number of pulses of the drive path at the slow speed.

2. The method according to claim 1, wherein in the learning routine, during the approach of the measurement probe to the measurement surface of the measurement object, a signal change of the measurement probe is recorded and in the case of a constant measurement signal being recorded by the measurement probe, the control signal is emitted to shut down the motor.

3. The method according to claim 1, wherein a reduction of the speed from the fast speed to the slow speed is reduced with a function of at least 1:10.

4. The method according to claim 1, wherein the predetermined drive speed for the learning routine to lower the measurement probe from the initial position into the measurement position is adjusted to be lower than the rapid speed during the implementation of the measurement.

5. The method according to claim 1, wherein after the implementation of the learning routine, the measurement object, the measurement object is shifted into a further measurement position for the implementation of at least one measurement by means of the measurement probe.

6. The method according to claim 1, wherein the drive path of the measurement probe in the direction of the measurement surface of the measurement object is determined at the slow speed by the number of pulses, which is equal to or smaller than a thickness of the layer to be measured on the measurement object or the thickness of the measurement object.

7. The method according to claim 1, wherein after the implementation of the learning routine on a measurement surface of the measurement object, the measurement object is shifted into a further measurement position for the implementation of at least one measurement by means of the measurement probe.

* * * * *